United States Patent
Walters (10) Patent No.: US 9,551,453 B2
(45) Date of Patent: *Jan. 24, 2017

(54) PULL-OUT SWIVEL MOUNT

(75) Inventor: James D. Walters, St. Charles, IL (US)

(73) Assignee: PEERLESS INDUSTRIES, INC., Aurora, IL (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/986,586

(22) Filed: Jan. 7, 2011

(65) Prior Publication Data

US 2011/0163215 A1    Jul. 7, 2011

Related U.S. Application Data (63) Continuation of application No. 11/528,200, filed on Sep. 27, 2006, now Pat. No. 7,866,621.

(Continued)

(51) Int. Cl.
*F16M 11/10*        (2006.01)
*F16M 11/20*        (2006.01)
(Continued)

(52) U.S. Cl.
CPC .......... *F16M 11/2007* (2013.01); *F16M 11/08* (2013.01); *F16M 11/10* (2013.01);
(Continued)

(58) Field of Classification Search
CPC ........ F16M 13/02; F16M 11/38; F16M 11/12; F16M 11/10; F16M 11/08; F16M 11/04; F16M 11/0227; F16M 11/2014; F16M 11/2085; F16M 11/2092; F16M 2200/061; F16M 11/2007

(Continued)

(56) References Cited

U.S. PATENT DOCUMENTS 419,521 A    1/1890   Heald et al.
848,465 A    3/1907   Homeyer
(Continued)

FOREIGN PATENT DOCUMENTS

EP          1 586 803 A2    10/2005
WO    WO 2004/002282 A2    1/2004

OTHER PUBLICATIONS

Technical Data Sheet—Flat-Panel Pull-out Swivel Wall Mount, Models SP 850, SP 850P, SP 850-S, SP 850p-S, Sheet No. 202-9505-4, Mar. 5, 2007, 3 pages.

(Continued)

*Primary Examiner* — Jonathan Liu
*Assistant Examiner* — Guang H Guan
(74) *Attorney, Agent, or Firm* — Foley & Lardner LLP (57) ABSTRACT

A system for mounting a flat panel television or display to a surface such as a wall. A base plate is configured to operatively connect to a surface, while an adapter plate is configured to operatively connect to a display device. A plurality of connecting arms are used to operatively connect the base plate to the adapter plate. Each of the plurality of connecting arms includes a base plate engagement portion slidably engageable with slots in the base plate and an adapter plate engagement portion operatively connected to the adapter plate. Movement of the base plate engagement portions within the base plate's slots results in a translational movement of the adapter plate relative to the base plate.

18 Claims, 11 Drawing Sheets

Related U.S. Application Data (60) Provisional application No. 60/723,158, filed on Oct. 3, 2005.

(51) Int. Cl.

| *F16M 11/08* | (2006.01) |
|---|---|
| *F16M 11/12* | (2006.01) |
| *F16M 11/38* | (2006.01) |
| *F16M 13/02* | (2006.01) |

(52) U.S. Cl.
CPC ......... *F16M 11/12* (2013.01); *F16M 11/2014* (2013.01); *F16M 11/2085* (2013.01); *F16M 11/2092* (2013.01); *F16M 11/38* (2013.01); *F16M 13/02* (2013.01); *F16M 2200/024* (2013.01); *F16M 2200/061* (2013.01)

(58) Field of Classification Search
USPC ............ 248/279.1, 285.1, 286.1, 287.1, 917, 248/920–923, 274.1, 289.11, 282.2, 248/282.1; 108/50.02, 145; 312/7.2, 405, 312/405.1, 196, 223.3, 246; 52/239; 62/125

See application file for complete search history.

(56) References Cited

U.S. PATENT DOCUMENTS

| 1,695,357 | A | * | 12/1928 | Worden | B60J 3/02 |
|---|---|---|---|---|---|
| | | | | | 248/277.1 |
| 2,825,152 | A | | 3/1958 | Baylon | |
| 3,022,037 | A | | 2/1962 | Stallard | |
| 3,292,902 | A | | 12/1966 | Lynch | |
| 3,410,328 | A | | 11/1968 | Sasai | |
| 3,490,603 | A | * | 1/1970 | Willer | H05K 7/1417 |
| | | | | | 211/202 |
| 3,623,707 | A | * | 11/1971 | Klopp | 254/22 |
| 3,823,915 | A | * | 7/1974 | Koehler | B66F 7/08 |
| | | | | | 254/122 |
| 4,219,186 | A | | 8/1980 | Brewer | |
| 4,678,230 | A | | 7/1987 | Winkle | |
| 4,700,921 | A | | 10/1987 | Holbrook | |
| 5,088,790 | A | | 2/1992 | Wainwright et al. | |
| 5,217,181 | A | | 6/1993 | Hammarskjold et al. | |
| 5,330,147 | A | | 7/1994 | Volcheff et al. | |
| 5,393,029 | A | * | 2/1995 | Senko | A47B 23/043 |
| | | | | | 248/447 |
| 5,553,919 | A | | 9/1996 | Dennis | |
| 5,847,685 | A | | 12/1998 | Otsuki | |
| 6,402,109 | B1 | | 6/2002 | Dittmer | |
| 6,427,607 | B1 | * | 8/2002 | Palmer | 108/43 |
| 6,604,722 | B1 | | 8/2003 | Tan | |
| 6,682,157 | B2 | | 1/2004 | Ito | |
| D488,708 | S | | 4/2004 | Lam et al. | |
| D489,599 | S | | 5/2004 | Lam | |
| D493,800 | S | | 8/2004 | Pfister et al. | |
| D494,596 | S | | 8/2004 | Pfister | |
| D497,537 | S | | 10/2004 | O'Keene et al. | |
| 6,851,226 | B2 | | 2/2005 | MacGregor et al. | |
| D505,858 | S | | 6/2005 | O'Keene | |
| 6,905,101 | B1 | | 6/2005 | Dittmer | |
| 7,028,961 | B1 | | 4/2006 | Dittmer et al. | |
| 7,063,295 | B2 | * | 6/2006 | Kwon | 248/276.1 |
| D530,595 | S | | 10/2006 | Lam et al. | |
| 7,152,836 | B2 | | 12/2006 | Pfister et al. | |
| 7,178,774 | B2 | | 2/2007 | Kim | |
| D562,830 | S | | 2/2008 | Katagiri et al. | |
| 7,866,621 | B1 | * | 1/2011 | Walters | F16M 11/08 |
| | | | | | 248/421 |
| 7,891,620 | B2 | * | 2/2011 | Grabania | F16M 11/08 |
| | | | | | 248/285.1 |
| 8,654,275 | B2 | * | 2/2014 | Cheng | F16M 11/046 |
| | | | | | 248/919 |
| 8,864,000 | B2 | * | 10/2014 | Meyer | B60R 11/0235 |
| | | | | | 224/275 |
| 2002/0179801 | A1 | | 12/2002 | Kim | |
| 2005/0127253 | A1 | * | 6/2005 | Kim | 248/176.1 |
| 2006/0125360 | A1 | * | 6/2006 | Kim et al. | 312/405.1 |
| 2007/0023599 | A1 | | 2/2007 | Fedewa | |
| 2011/0163215 | A1 | * | 7/2011 | Walters | F16M 11/08 |
| | | | | | 248/220.22 |

OTHER PUBLICATIONS

Technical Data Sheet—Flat-Panel Pull-out Swivel Wall Mount with Universal Adapter Bracket, Models: SP850-UNL, SP850UNLP, SP850-UNL-S, SP850-UNLP-S, SP850-UNLP-GB, SP850-UNLP-GS, Sheet No. 202-9550-2, Dec. 15, 2006, 4 pages.

Technical Data Sheet—Flat-Panel Pull-out Swivel Wall Mount, Models: FPS 1000, FPS 1000-GB, Sheet No. 202-9504-6, Dec. 15, 2006, 2 pages.

Sanus Vision Mount—VMAA26, Model VMAA26, Doc No. 6901-002110, 2010, Installation Instructions, 50 pages.

*Peerless Industries, Inc. v. Loctek Visual Technology Corp.*, Loctek Visual Technology Corp.'s Initial Non-Infringement and Invalidity Contentions, Exhibit D-1, Invalidity Claim Chart for U.S. Pat. No. 7,866,621, based on Peerless FPS 1000 Mount, Civil Action No. 12-cv-6248, filed Nov. 16, 2012, 9 pages.

*Peerless Industries, Inc. v. Loctek Visual Technology Corp.*, Loctek Visual Technology Corp.'s Initial Non-Infringement and Invalidity Contentions, Exhibit D2, Invalidity Claim Chart for U.S. Pat. No. 7,866,621, based on Peerless SP850 Mount, Civil Action No. 12-cv-6248, filed Nov. 16, 2012, 10 pages.

*Peerless Industries, Inc. v. Loctek Visual Technology Corp.*, Loctek Visual Technology Corp.'s Initial Non-Infringement and Invalidity Contentions, Exhibit D-3, Invalidity Claim Chart for U.S. Pat. No. 7,866,621, based on Peerless SP850 Mount, Civil Action No. 12-cv-6248, filed Nov. 16, 2012, 9 pages.

*Peerless Industries, Inc. v. Loctek Visual Technology Corp.*, Loctek Visual Technology Corp.'s Initial Non-Infringement and Invalidity Contentions, Exhibit D-4, Invalidity Claim Chart for U.S. Pat. No. 7,866,621, based on U.S. Publication No. U.S. 2206/0125360 to Kim, Civil Action No. 12-cv-6248, filed Nov. 16, 2012, 37 pages.

*Peerless Industries, Inc. v. Loctek Visual Technology Corp.*, Loctek Visual Technology Corp.'s Initial Non-Infringement and Invalidity Contentions, Exhibit D5, Invalidity Claim Chart for U.S. Pat. No. 7,866,621, based on U.S. Pat. No. 419,521 to Heald, Civil Action No. 12-cv-6248, filed Nov. 16, 2012, 36 pages.

*Peerless Industries, Inc. v. Loctek Visual Technology Corp.*, Loctek Visual Technology Corp.'s Initial Non-Infringement and Invalidity Contentions, Exhibit D-6, Invalidity Claim Chart for U.S. Pat. No. 7,866,621 based on U.S. Pat. No. 6,905,101 to Dittmer, Civil Action No. 12-cv-6248, filed Nov. 16, 2012, 38 pages.

*Peerless Industries, Inc. v. Loctek Visual Technology Corp.*, Loctek Visual Technology Corp.'s Initial Non-Infringement and Invalidity Contentions, Exhibit D-7, Invalidity Claim Chart for U.S. Pat. No. 7,866,621, based on U.S. Pat. No. 5,847,685 to Otsuki, Civil Action No. 12-cv-6248, filed Nov. 16, 2012, 37 pages.

*Peerless Industries, Inc. v. Loctek Visual Technology Corp.*, Loctek Visual Technology Corp.'s Initial Non-Infringement and Invalidity Contentions, Exhibit D-8, Invalidity Claim Chart for U.S. Pat. No. 7,866,621, based on U.S. Pat. No. 5,088,790 to Wainwright, Civil Action No. 12-cv-6248, filed Nov. 16, 2012, 36 pages.

*Peerless Industries, Inc. v. Loctek Visual Technology Corp.*, Loctek Visual Technology Corp.'s Initial Non-Infringement and Invalidity Contentions, Exhibit D-9, Invalidity Claim Chart for U.S. Pat. No. 7,866,621, based on PCT Application No. WO 2004/002282 to Wegrzecki, Civil Action No. 12-cv-6248, filed Nov. 16, 2012, 32 pages.

*Peerless Industries, Inc. v. Loctek Visual Technology Corp.*, Loctek Visual Technology Corp.'s Initial Non-Infringement and Invalidity Contentions, Exhibit D-10, Invalidity Claim Chart for U.S. Pat. No. 7,866,621, based on U.S. Pat. No. 4,678,230 to Winkle, Civil Action No. 12-cv-6248, filed Nov. 16, 2012, 33 pages.

(56) References Cited

OTHER PUBLICATIONS

*Peerless Industries, Inc.* v. *Loctek Visual Technology Corp.*, Loctek Visual Technology Corp.'s Initial Non-Infringement and Invalidity Contentions, Civil Action No. 12-cv-6248, filed Nov. 16, 2012, pp. 1, 2, 7-11 and 44-56.

* cited by examiner

PULL-OUT SWIVEL MOUNT

CROSS-REFERENCE TO RELATED APPLICATIONS

This application is a continuation of U.S. patent application Ser. No. 11/528,200, filed Sep. 27, 2006. U.S. patent application Ser. No. 11/528,200 claims priority to U.S. Provisional Patent Application No. 60/723,158, filed Oct. 3, 2005. Both applications are incorporated herein by reference in their entirety.

FIELD OF THE INVENTION

The present invention relates generally to mounting systems for electronic devices. More particularly, the present invention relates to tilting mount systems for flat-panel televisions and similar devices.

BACKGROUND OF THE INVENTION

In recent years, flat-panel television units have become enormously popular in both the commercial and the residential sectors. As the prices for plasma and liquid crystal display (LCD) flat panel displays have continued to fall, and as the quality for the same devices has improved, more and more businesses and individuals have purchased such devices both for business and home entertainment purposes.

One of the advantages of flat-panel television units that customers have found particularly appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However, these systems usually require professional installation and, once the television is secured in the mount, it is often very difficult to access and adjust due to its height.

With flat-panel televisions, on the other hand, users are presented with a relatively new option: mounting the television directly to a wall. By mounting the television to a wall, a person can eliminate the need to take up potentially valuable floor space with a television stand or entertainment unit. Furthermore, individuals and entities can mount the television at a sufficiently low height to be able to adjust the television's orientation with little difficulty.

Although the introduction of flat-panel televisions on a wide scale has presented new opportunities to both residential and commercial customers, it has also presented new challenges. Over the past few years, a number of wall mounting systems have been developed for use with flat panel televisions, but each has its own drawbacks. For example, U.S. Pat. No. 6,402,109 discloses a wall mounting system that permits a flat panel television to have a limited range of motion once it is mounted to the wall. Although somewhat useful, the system described in this reference has only a limited range of motion, is relatively expensive to manufacture due to the number of components, and provides the user with no ability to rotate the television about an axis that is substantially perpendicular to the ground. Additionally, such a system provides the user with no ability to pull the television away from the wall, further limiting the television's range of motion.

U.S. Pat. No. 6,905,101 and U.S. Application Publication No. 2004/0245420 disclose mounting systems that provide the television with a greater degree of potential motion. However, the systems described in these references are extremely complex in nature, particularly when an articulating arm is included to permit the television to be pulled away from the wall. More particularly, the articulating arm on such products often has up to three separate joints, each of which adds to the product's complexity and cost to manufacture. The multiple joints also cause additional friction to exist in the system, which can wear out plastic components rather quickly. Additionally, such designs can have significant stability and control issues when the television is pulled away from the wall, as the mass of the television creates a significant moment that can place significant forces on the single articulating arm. This can pose both product integrity and safety issues. Furthermore, such systems can be so large, heavy and bulky that installation becomes exceedingly difficult, often requiring two or more persons to correctly install the device. This is particularly problematic for flat panel televisions, which are often heavier than conventional tube televisions. Lastly, such mounting systems often cannot "collapse" into a very low profile when the television is not intended to be extended away from the wall. This can result in a loss of space in a room and create the appearance of increased clutter.

It would therefore be desirable to provide a wall mounting system that is simple in design, easy to install, while still being constructed to permit users to orient a flat panel display in a variety of positions.

SUMMARY OF THE INVENTION

The present invention provides an improved mounting system for flat panel televisions and display units. The mounting system of the present invention includes a base plate and an adapter plate. The base plate mounts to a fixed surface, such as a wall, while a flat panel display mounts to the adapter plate. First and second sliding arms operatively engage both the base plate and the adapter plate. The sliding arms are configured to travel through a plurality of slots in the base plate in order to permit the adapter plate to translate away from and toward the base plate as desired. Additionally, the sliding arms are configured to permit the adapter plate to rotate relatively to the base plate.

The present invention provides for an improved mounting assembly that is simple in construction, simple to install, easy to operate, and provides the user a wide range of positioning options. In addition, the mounting system possesses a very thin profile, making it barely visible in many ordinary-use conditions. In fact, in the event that the mount can be recessed into the wall, the mount can have virtually no actual profile at all beyond the wall. By providing a variety of different positioning options, the mounting system permits the user to adjust the television in order to provide alternative viewing angles, as well as reduce or eliminate glare from sunlight or other light sources, while also generating a relatively low level of friction in the process. Furthermore, the simplicity of the mounting system of the present invention adds to the product's overall sturdiness and stability.

These and other advantages and features of the invention, together with the organization and manner of operation thereof, will become apparent from the following detailed description when taken in conjunction with the accompa-

DETAILED DESCRIPTION OF THE PREFERRED EMBODIMENTS

Figure 1:
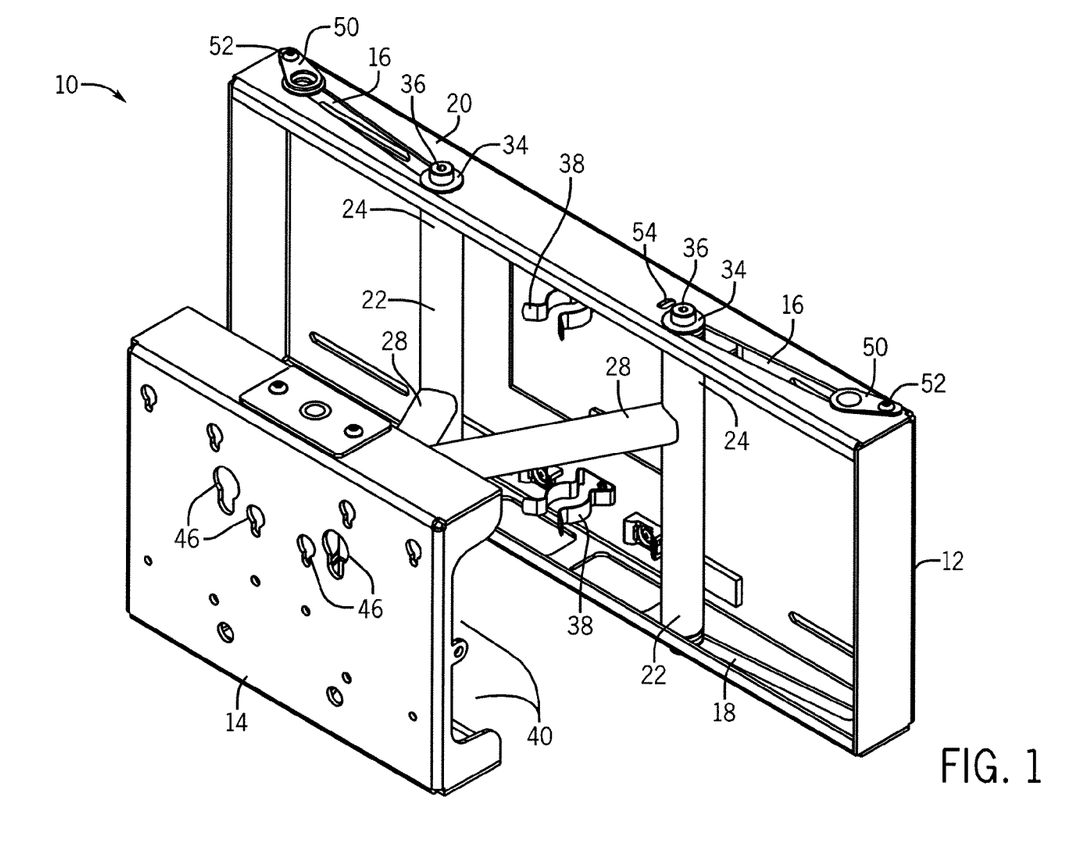
FIG. 1 is a perspective view of a mounting system constructed in accordance with one embodiment of the present invention, with the adapter plate in an extended position.
Figure 2:
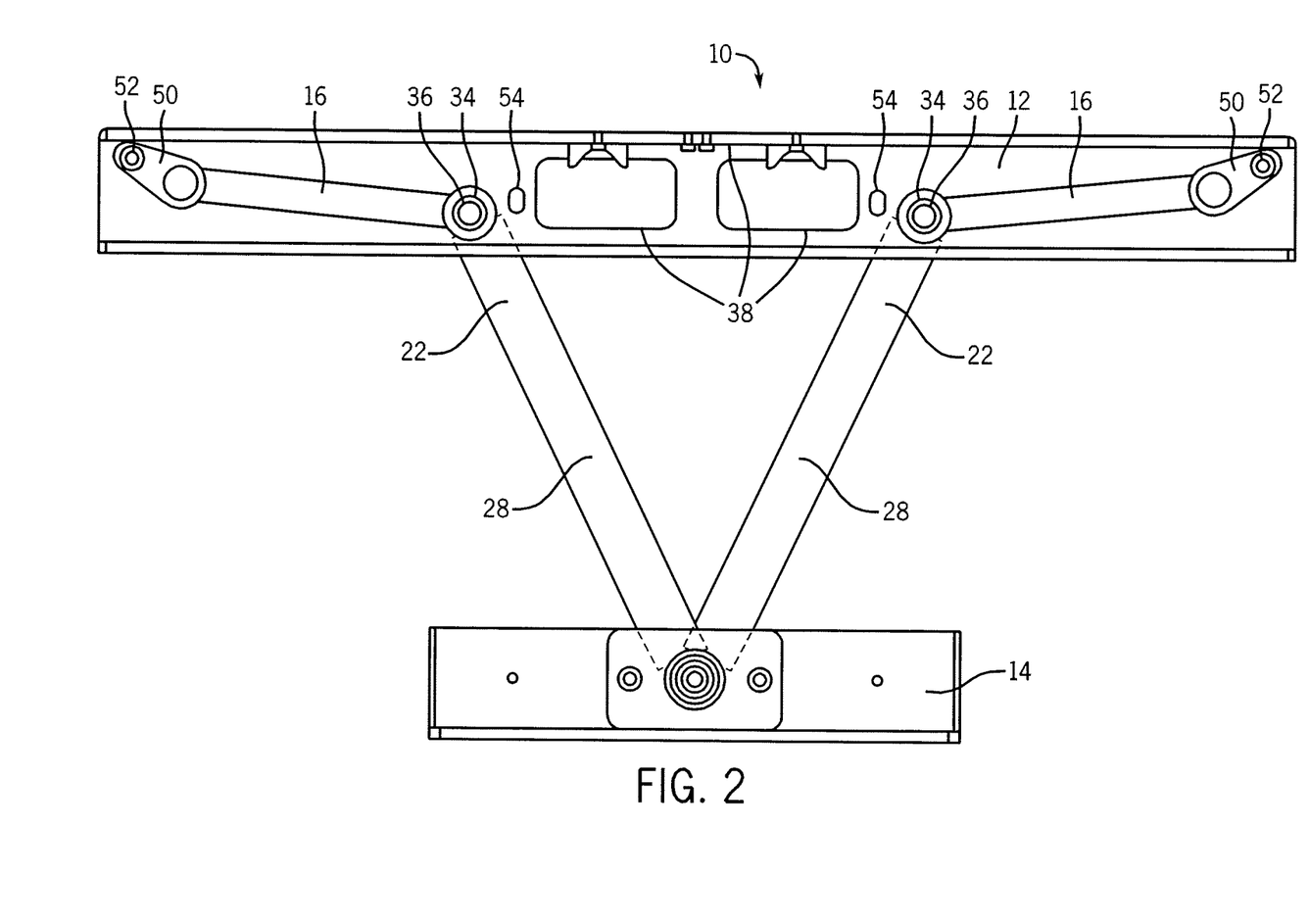
FIG. 2 is a top view of the mounting system of FIG. 1, with hidden components shown in phantom.
Figure 3:
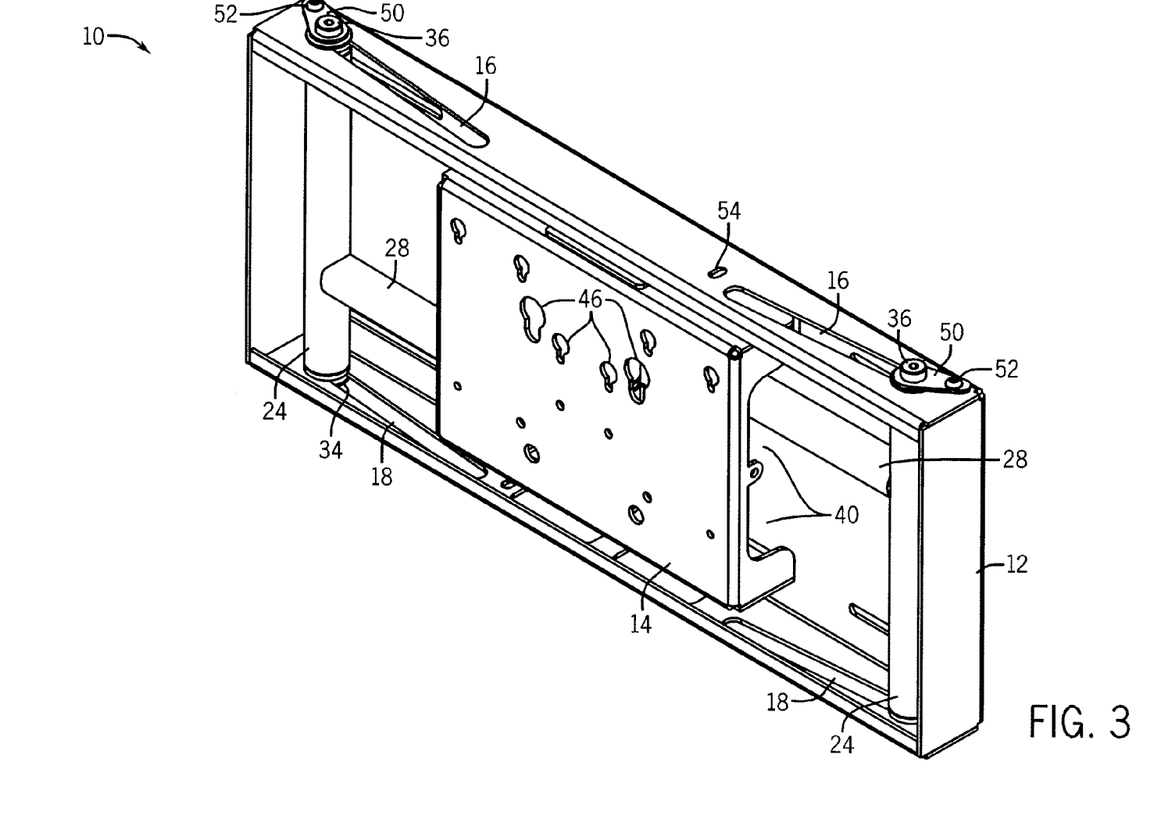
FIG. 3 is a perspective view of the mounting system of FIG. 1 when in a retracted position.

As shown in FIGS. 1-3, a mounting system 10 according to one embodiment of the present invention comprises a base plate 12 and an adapter plate 14. The base plate 12 is configured to attach to a flat surface such as a wall, while the adapter plate 14 is configured to attach to a flat panel television or display. When the mounting system 10 is fully assembled, the base plate 12 and the adapter plate 14 are operatively connected to each other via a plurality of connecting arms 22. It should be understood that, as used herein, the phrase "operatively connected" does not require that the two components in question be physically connected to or in physical contact with each other. Instead, an operative connection can involve the use of a number of intermediate components.

Figure 4:
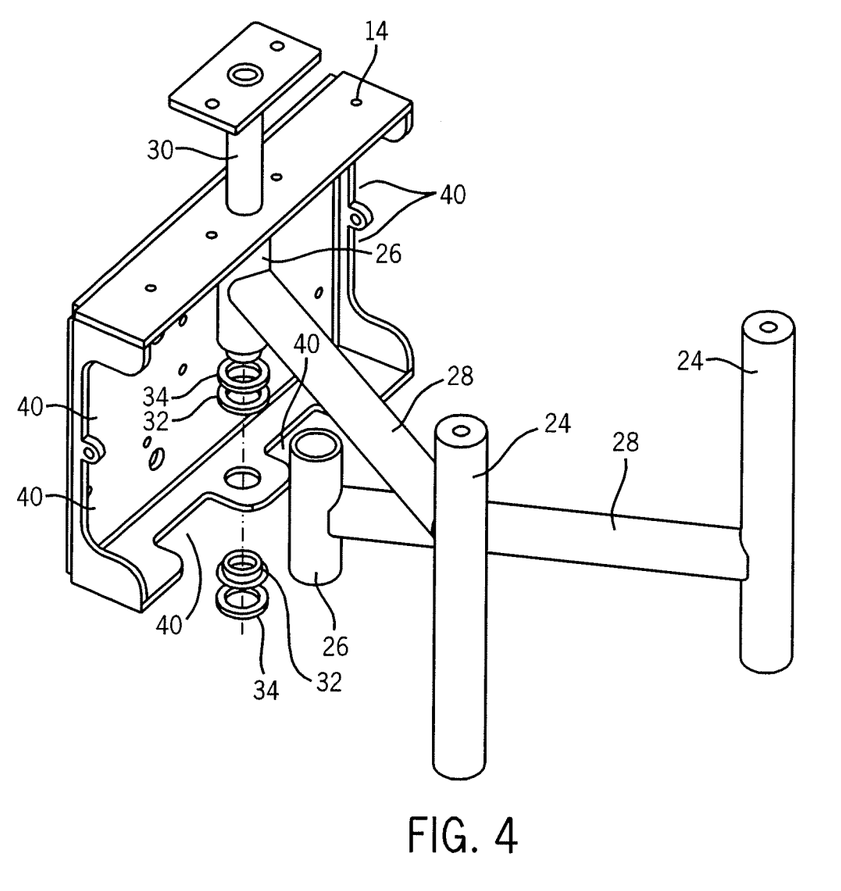
FIG. 4 is a reverse perspective view of the mounting system of FIG. 1, in a first disassembled position with the base plate removed.
Figure 5:
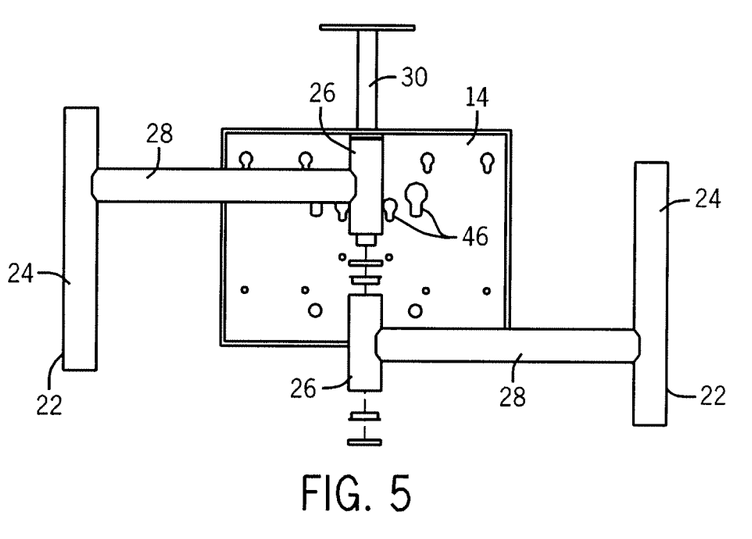
FIG. 5 is a rear view of the mounting system of FIG. 1, in a second partially disassembled position with the base plate removed.
Figure 6:
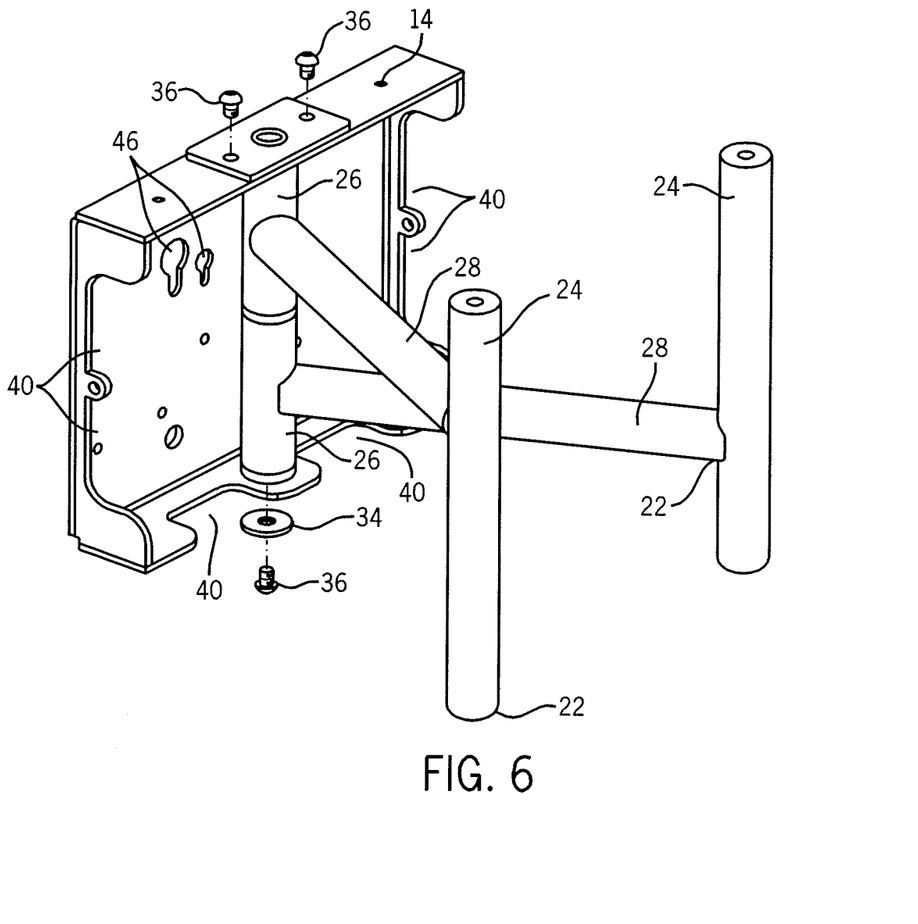
FIG. 6 is another reverse perspective view of the mounting system of FIG. 1, in a third partially disassembled position with the base plate removed.

As is shown in detail in FIGS. 4-6, each of the plurality of connecting arms 22 comprises a base plate engagement portion 24, an adapter plate engagement portion 26, and an intermediate portion 28. In one embodiment of the invention, both the base plate engagement portion 24 and the adapter plate engagement portion 26 are fixedly connected and are substantially perpendicular to the intermediate portion 28, with the intermediate portion 28 being substantially perpendicular to both the base plate 12 and the adapter plate 14. However, it is also possible for these components to be connected to each other at a non-perpendicular orientation, and it is also possible for the components to be releasably secured to each other. With regard to the orientation of the components, for example, it is possible for any or all of the components to have a slight non-perpendicular orientation in order to give the adapter plate 14 and connected display a negative tilt, which would be beneficial for systems that are mounted near the ceiling. The adapter plate 14 may also include one or more relief cutouts 40 within the lower surface thereof. These relief cutouts 40 can be used for cord management purposes, permitting a user to route power cords and other cords as necessary. Relief cutouts 40 may also be located in the sides or top of the adapter plate 14 as necessary.

As shown in FIGS. 1-3, the base plate 12 includes a plurality of upper slots 16 on a top surface thereof, as well as a plurality of lower slots 18 on a lower surface thereof. The plurality of upper slots 16 and the plurality of lower slots 18 are configured to accept the respective top and bottom portions of the base plate engagement portion 24 of each connecting arm 22. In one embodiment of the invention, the base plate engagement portions 24 are slidably connected to the base plate 12 via fasteners 36 and washers 34, although other connection mechanisms known in the art may also be used. Side portions of the base plate 12 may also include grommets 42 comprising vinyl-lined steel or similar materials. The grommets 42 can be strategically placed to contact a display unit (not shown) when the display unit is attached to the adapter plate 14 and when the mounting system 10 is in a fully retracted position.

As is shown in FIGS. 4-6, the connecting arms 22 are also operatively connected to the adapter plate 14. In the embodiment shown in FIGS. 4-6, this is accomplished through the use of an axial rod 30. The axial rod 30 passes through both the top and bottom of the adapter plate 14, as well as the adapter plate engagement portion 26 of the plurality of connecting arms 22. The axial rod 30 is then secured via conventionally-known fasteners 36 to the top and bottom of the adapter plate 14. Washers 34 can also be used in this portion of the mounting system 10. By passing the axial rod 30 through the adapter plate engagement portion 26, without physically attaching to it, the adapter plate engagement portion 26 is capable of rotating relative to the adapter plate 14 as necessary or desired.

Figure 7:
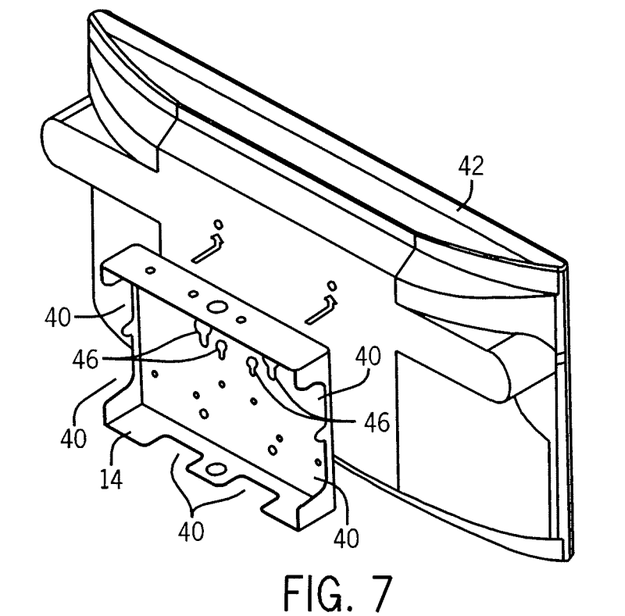
FIG. 7 is a view showing the process for attaching the adapter plate directly to the back of a flat panel display.
Figure 8:
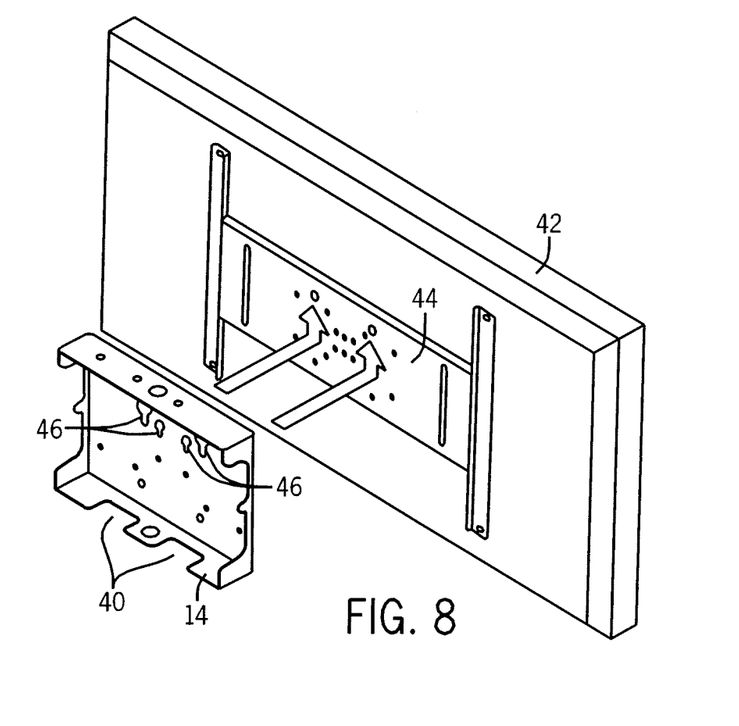
FIG. 8 is a view showing the process for attaching the adapter plate to the back of a flat panel display via an intermediate bracket.

As shown in FIG. 7, the adapter plate 14 is configured to attach directly to the back of a display unit 42. In particular, the adapter plate 14 includes a variety of mounting holes 46 through which screws or bolts can pass before being connected to the display unit 42. Some or all of the variety of mounting holes 46 can be strategically placed to match with corresponding holes on displays that are compliant with Video Electronics Standards Association (VESA) standards. Furthermore, the mounting holes 46 can be configured such that a rotational adjustment of the display unit 42 relative to the adapter plate 14 is permissible about an axis substantially parallel to the axes of mounting holes 46. FIG. 8 shows an alternative embodiment of the invention, where the adapter plate 14 is attached to the display unit 42 via an intermediate plate 44.

The operation of the mounting system 10 of FIGS. 1-6 is generally as follows: FIG. 3 shows the mounting system 10 in a fully retracted position, where the adapter plate 14 and the associate television or display unit 42 is not extended away from the wall or other mounting surface. In this position, the base plate engagement portion 24 of the plurality of connecting arms 22 is positioned at the farthest possible points in the plurality of upper and lower slots 16 and 18 of the base plate 12 from the center of the base plate 12 as possible. In this position, the profile or depth of the mounting system 10 is at a minimum. It should be noted that the mounting system 10 may also include a plurality of locking tabs 50 for securing the base plate engagement portion 24 in this position. The locking tabs, which can be positioned at the top and/or the bottom of the mounting plate 12. A locking tab fastener 52 is used to fix the respective locking tab 50 with a locking tab hole 54, and the opposite side of the locking tab 50 is used to secure the base plate engagement portion 24 via the fasteners 36. The locking tab holes 54 can be positioned at both ends of each upper slot 16 and lower slot 18, as well as other positions as necessary or desired.

When a user wishes to pull the display unit 42 away from the wall or other mounting surface, he or she simply pulls the display unit 42 in the desired direction. This pulling movement causes the base plate engagement portion 24 to slide along the plurality of upper and lower slots 16 and 18 towards the center of the base plate 12. As this occurs, the adapter plate engagement portion 26 rotates as necessary about the axial rod 30. The mounting system 10 in the fully extended position is shown in FIGS. 1-2. Because of the vertical orientation of the base plate engagement portion 24 and the horizontal nature of the plurality of upper and lower slots 16 and 18, there is little risk of any undesired translational movement of the adapter plate 14 relative to the base plate 12.

In addition to the above, the mounting system 10 of FIGS. 1-3 also permits the adapter plate 14 and any attached television or display unit 42 to rotate or pan as desired by the user. In particular, because the adapter plate engagement portion 26 is not physically joined to the axial rod 30 or the adapter plate 14, the adapter plate 14 is capable of rotating about an axis corresponding to the major axis of the axial rod 30. In a conventional wall-mounting setup, this results in the adapter plate 14 and any attached device being capable of rotating to the left or right. This permits the user to alter the orientation of the device for any reason, such as to prevent sunlight-induced glare.

Figure 12:
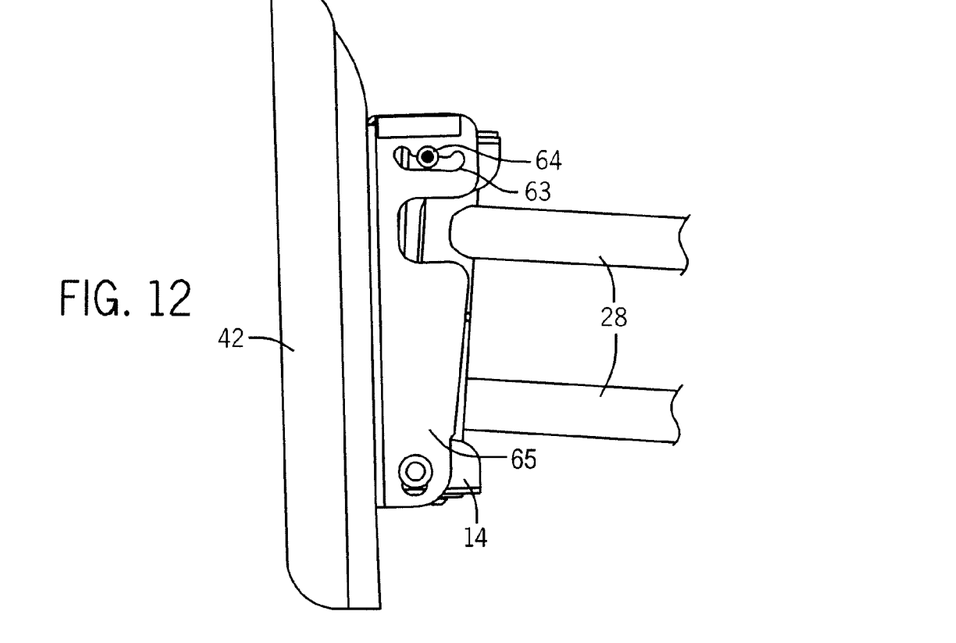
FIG. 12 is a view of a further embodiment of the mounting system of FIG. 1, showing a rotatable display mount that provides for tilt of the display with respect to the mounting system.
Figure 13:
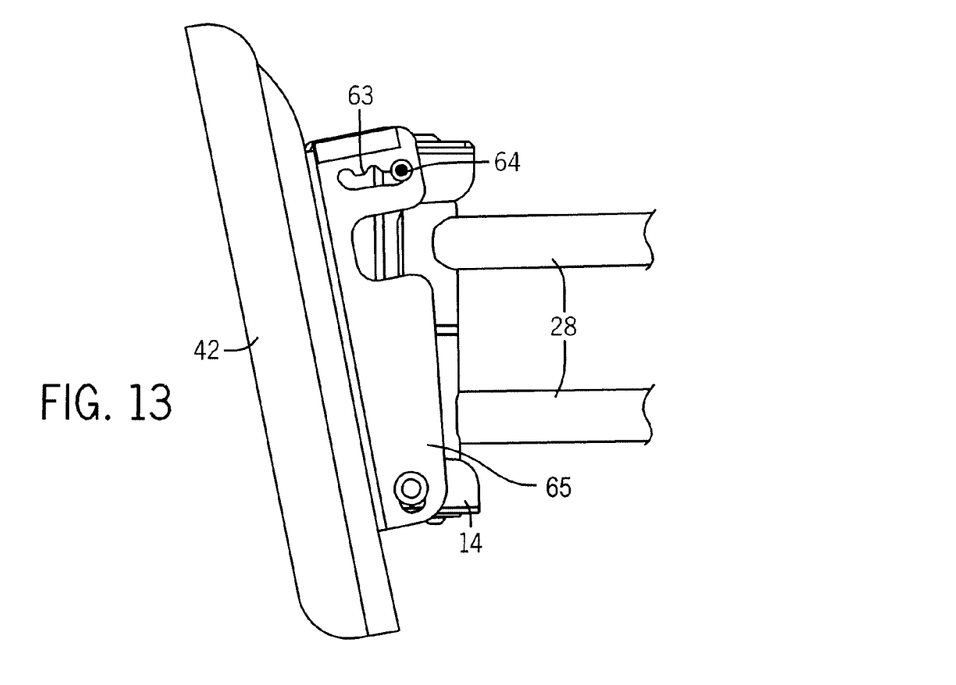
FIG. 13 is an additional view of the embodiment shown in FIG. 12, showing a second tilt position of the rotatable display mount and the display to a desired tilt angle.

Various embodiments of the present invention include other features that may also be beneficial to most users. For example, in the embodiment shown in FIGS. 1-3, a plurality of cable mounts 38 can be attached to the base plate 12 for accepting cables from the television or display unit 42. These plurality of cable mounts 38 can be used to store and direct the respective cable towards a desired location, as well as hide the cable from view. In other embodiments of the invention, instead of having the adapter plate engagement portion 26 be substantially perpendicular to the intermediate portion 28 of the plurality of connecting arms 22, these components can be angled at other orientations relative to each other. For example, the adapter plate engagement portion 26 can be slightly angled such that the adapter plate 14, and therefore any attached television or display unit 42, has a slight negative tilt. In a case where a television is mounted along a wall near the ceiling, this can provide a better angle for viewing. It should also be noted that various embodiments of the present invention can comprise mounting systems 10 that are capable of tilting about other axes than the systems shown in FIGS. 1-11. For example, as shown in the embodiments illustrated in FIGS. 12-13, a display mount 65 is attached to the adapter plate 14 and is capable of tilting upward and/or downward, i.e., about an axis that is substantially perpendicular to the translational direction of the adapter plate and substantially parallel to the mounting surface of the mounting plate 12. In this embodiment, it is further possible to incorporate a plurality of preset tilt angles 63, whereby the tilt of the display mount 65 relative to the adapter plate 14 may be conveniently and securely established through a conventional fastener 64 or other locking mechanism known in the art.

Figure 9:
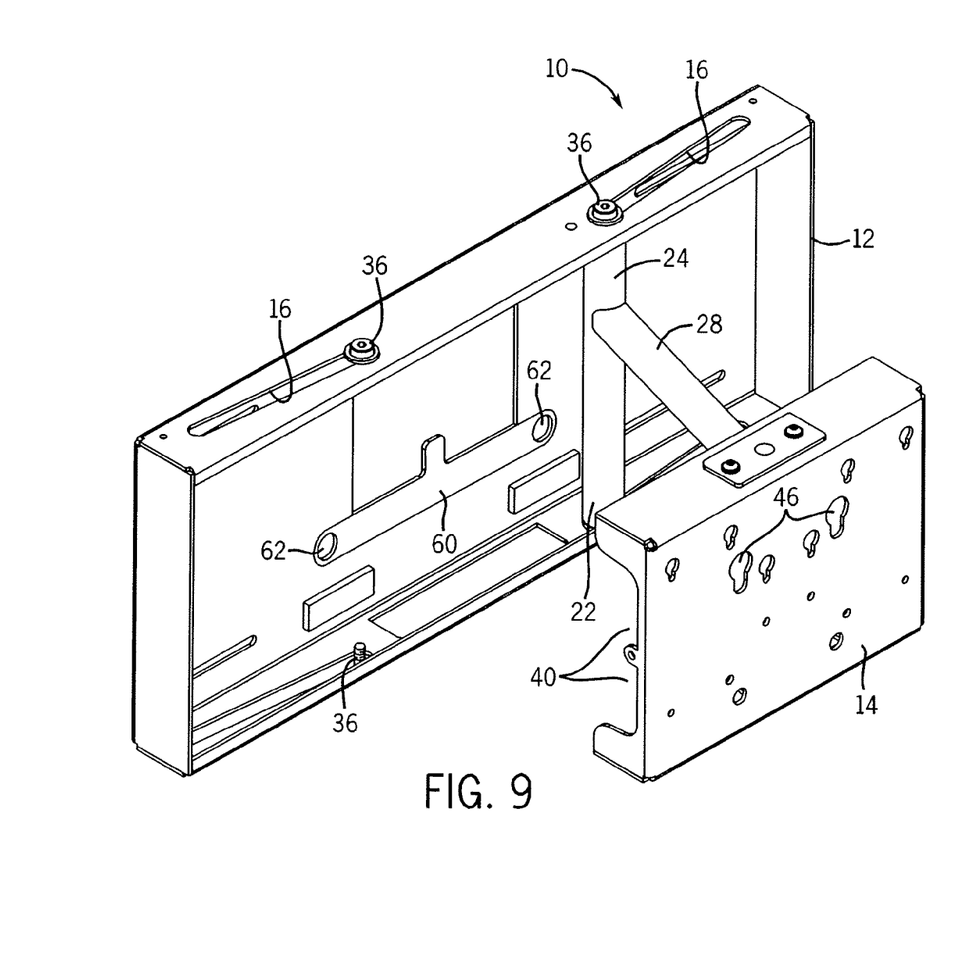
FIG. 9 is a perspective view of a portion of a mounting system constructed according to a second embodiment of the present invention, where an integrated locking member is securely positioned within the base plate.
Figure 10:
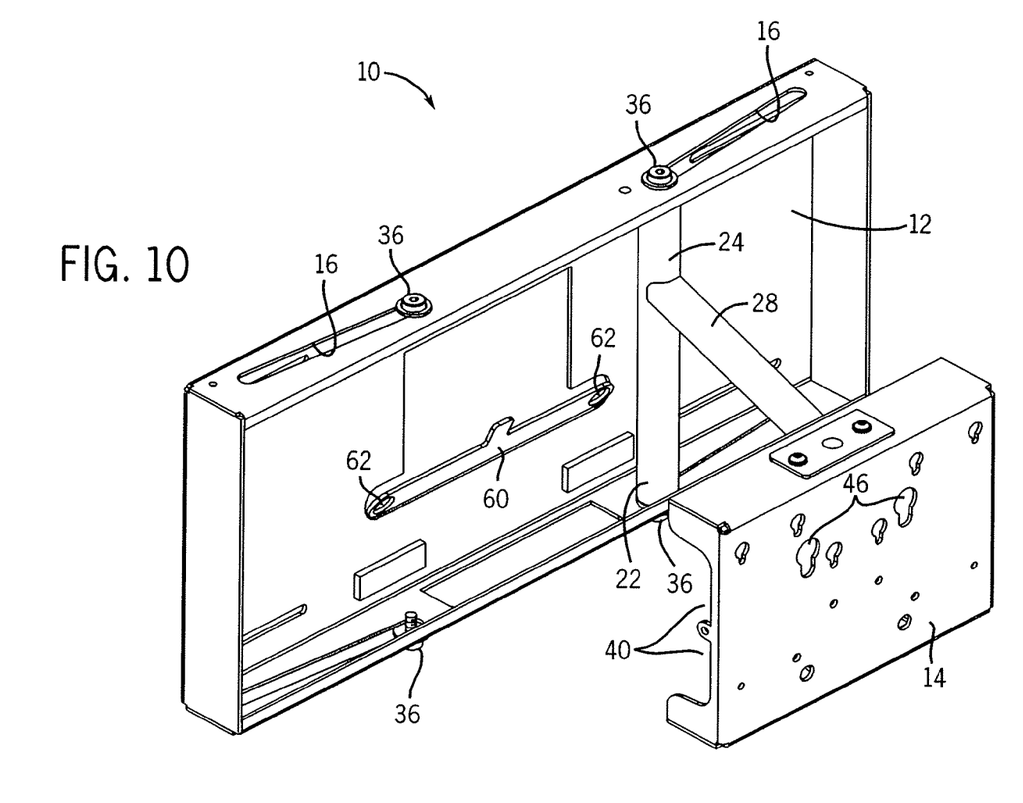
FIG. 10 is a second perspective view of a portion of the mounting system of FIG. 9, where the integrated locking member is in the process of being removed from the base plate.
Figure 11:
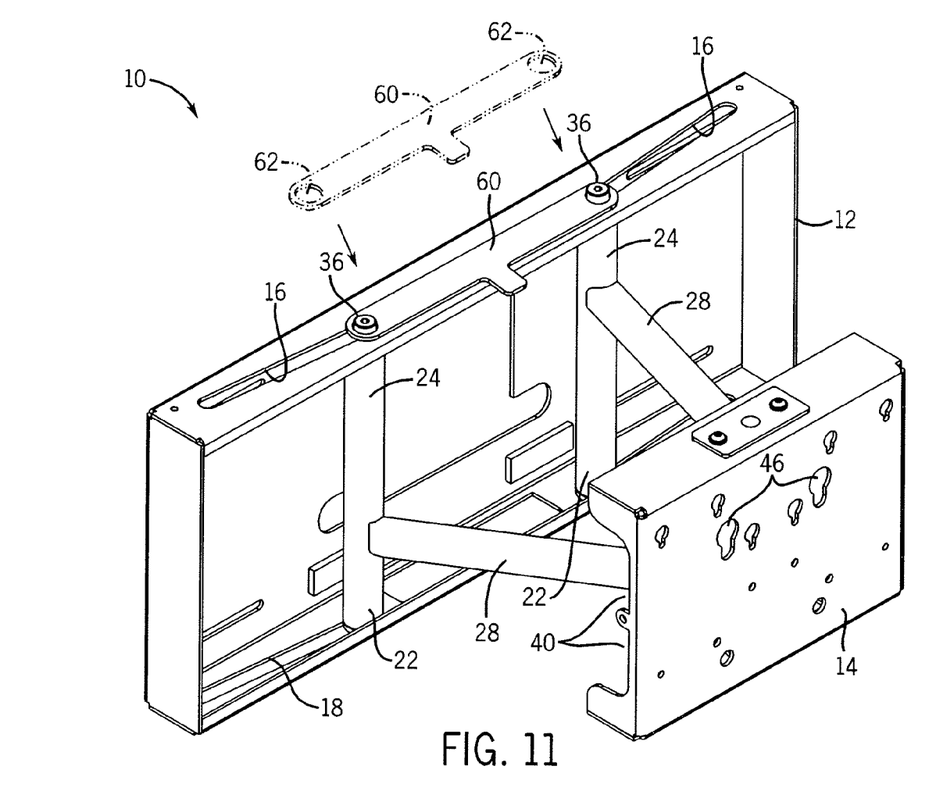
FIG. 11 is a third perspective view of a portion of the mounting system of FIG. 9, showing how the integrated locking member is used to fix the position of the mounting system in an extended position.

FIGS. 9-11 show a mounting system 10 constructed according to an alternate embodiment of the present invention. The mounting system 10 of FIGS. 9-11 includes an integrated locking member 60 that replaces the locking tabs 50 of FIGS. 1-8. The integrated locking member 60, which can be positioned within the base plate 12 in one embodiment of the invention, includes locking member holes 62 that are sized to constrain the fasteners 36 for the respective base plate engagement portions 24 when the mounting system 10 is in a fully extended position.

In addition to the embodiments described above, the principles of the present invention are also applicable to various other embodiments. For example, the arrangement of the various components in FIGS. 1-6 can essentially be reversed. There, the adapter plate 14 includes a plurality of slots for accepting one portion of the sliding arms, while an axial rod 30 is connected to the base plate 12 and is used to align the other ends of the axial rod 30. It is also possible to substitute the axial rod 30 with other components that allow the adapter plate engagement portion 26 to rotate while still being secured (directly or indirectly) to the adapter plate 14. Other embodiments and modifications would be understood and recognized by those skilled in the art.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system for mounting a display unit to a wall, comprising:
   a base portion having a rear surface configured to operatively connect to the wall, the base portion including an upper portion and a lower portion substantially parallel to the upper portion;
   an adapter portion;
   a device mount configured to operatively connect to a display device, the device mount pivotably coupled to the adapter portion; and
   a pair of connecting arms, each of the connecting arms including:
      a base engagement portion extending between the upper portion and the lower portion of the base portion, the base engagement portion slidably translatable from a first position to a second position via a top portion of the base engagement portion sliding relative to the upper portion of the base portion and a bottom portion of the base engagement portion sliding relative to the lower portion of the base portion, an adapter engagement portion rotatably coupled to the adapter portion, and an intermediate portion extending between the adapter engagement portion and the base engagement portion, wherein the intermediate portion is selectively nested within the base portion when the base engagement portion is at the first position, wherein at least a substantial part of the intermediate portion is not nested within the base portion when the base engagement portion is at the second position;

wherein a movement of each base engagement portion between the first position and the second position results in an outward translational movement of the adapter portion relative to the base portion, the outward translational movement increasing a distance between the adapter portion and the base portion when each base engagement portion is moved from the first position to the second position;

wherein the adapter portion is selectively moveable about a first axis relative to the adapter engagement portions and relative to the base portion, the first axis being substantially parallel to the base engagement portions of the pair of connecting arms; and wherein the device mount is selectively moveable about a second axis relative to the adapter portion, the second axis being perpendicular to the first axis.

2. The mounting system of claim 1, wherein each of the pair of connecting arms is selectively nestable within an aperture defined by the upper portion and the lower portion within the base portion.

3. A wall mounting system, comprising:

a first portion including a mount surface configured to operatively connect to a surface and defining an aperture therein, the first portion including an upper portion having a pair of coplanar upper slots formed in an upper surface thereof and a lower portion having a pair of coplanar lower slots formed in a lower surface thereof, the upper surface being substantially parallel to the lower surface, the pair of upper slots and the pair of lower slots comprising uninterrupted substantially straight slots;

a second portion configured to operatively connect to a device, the second portion selectively translatable between an extended position and a retracted position; and a plurality of connecting members operatively connecting the first portion to the second portion, each of the plurality of connecting members having an upper slot engagement portion slidably engaged with an upper slot of the pair of coplanar upper slots of the first portion and a lower slot engagement portion slidably engaged with a lower slot of the pair of coplanar lower slots of the first portion, each of the plurality of connecting members having a second portion connecting portion operatively connected to the second portion via a rotatable connection at a fixed location relative to the second portion, the rotatable connection being at an opposite end of each connecting member of the plurality of connecting members relative to the upper slot engagement portion and the lower slot engagement portion for each connecting member, each of the plurality of connecting members having an intermediate portion extending between the second portion connecting portion and the upper and lower slot engagement portions, the intermediate portion being selectively nested within the aperture when the second portion is at the retracted position, at least a substantial part of the intermediate portion not being nested within the aperture when the second portion is at the extended position, wherein a movement of the plurality of connecting members via the sliding engagement of the upper slot engagement portions with the upper slots and the lower slot engagement portions with the lower slots results in a translation distance between a face of the first portion and a face of the second portion along a first axis, the face of the first portion and the face of the second portion being substantially parallel during the movement, the first axis being substantially perpendicular to the mount surface of the first portion, and wherein the second portion is selectively adjustable about a second axis, the second axis not parallel to the first axis.

4. The wall mounting system of claim 3, wherein a rotational orientation between the first portion and the second portion is adjustable when the second portion is in the extended position.

5. The wall mounting system of claim 3, wherein the second axis is also substantially parallel to a vertical plane defined by a direction of change in translational distance between the first portion and the second portion.

6. The wall mounting system of claim 3, further comprising a rod member coupled to the second portion and configured to secure a translational position of each second portion connecting portion to the second portion.

7. The wall mounting system of claim 6, wherein each second portion connecting portion is rotatable relative to the rod member.

8. A mounting system for mounting a display unit to a wall, comprising:

a base having a mounting surface configured to operatively attach to the wall, an upper portion, and a lower portion, the upper portion being substantially parallel to the lower portion;

an adapter having a surface configured to operatively attach to the display unit; and a plurality of connecting arms slidably engaged with the base via guide paths formed in the upper portion and the lower portion, each of the plurality of connecting arms including:

a base engagement portion at a first end of the respective connecting arm and slidably engaged with a guide path of the guide paths of the upper portion of the base and a guide path of the guide paths of the lower portion of the base, the base engagement portion being movable between a first position and a second position relative to the base, an adapter engagement portion at a second end of the respective connecting arm, the second end being at an opposite end relative to the first end, the adapter engagement portion being rotatably coupled at a fixed location to the adapter and operatively connected to the base engagement portion of the respective connecting arm, and an intermediate portion extending between the adapter engagement portion and the base engagement portion, wherein the intermediate portion is selectively nested within the base portion when the base engagement portion is at the first position, wherein at least a substantial part of the intermediate portion is not nested within the base portion when the base engagement portion is at the second position;

wherein a movement of the plurality of connecting arms relative to the base via the guide paths results in a translational movement of the adapter relative to the base between a retracted position and an extended position, and wherein the surface of the adapter is substantially parallel to the mounting surface of the base when in the retracted position and when in the extended position.

9. The mounting system of claim 8, the plurality of connecting arms comprising a first connecting arm and a second connecting arm, the system further comprising a rod member rotatably connecting the adapter engagement portion of the first connecting arm and the adapter engagement portion of the second connecting arm to the adapter.

10. The mounting system of claim 8, wherein the adapter is rotatable relative to the base about an axis substantially perpendicular to a direction of translational movement of the adapter relative to the base.

11. The mounting system of claim 8, the plurality of connecting arms comprising a first connecting arm and a second connecting arm, wherein the movement of the base engagement portion of the first connecting arm and the base engagement portion of the second connecting arm relative to the base results in a translational movement of the adapter in a direction substantially perpendicular to the mounting surface of the base.

12. The mounting system of claim 8, the plurality of connecting arms comprising a first connecting arm and a second connecting arm, the system further comprising a locking member selectively engageable with the base engagement portion of the first connecting arm and the base engagement portion of the second connecting arm when the adapter is in the extended position, thereby substantially locking the adapter in the extended position.

13. The mounting system of claim 8, wherein the plurality of connecting arms is nestable within an aperture formed within the base between the upper portion and the lower portion.

14. The mounting system of claim 13, wherein the adapter is nestable within the aperture.

15. A wall mounting system, comprising:
a mounting portion including a mount surface configured to operatively connect to a surface, the mounting portion including an upper portion and a lower portion, the upper portion being oriented substantially parallel to the lower portion, the upper portion and the lower portion cooperating to define an aperture in the mounting portion;
a device portion configured to operatively connect to a device, the device portion selectively translatable between an extended position and a retracted position; and
a plurality of connecting members operatively connecting the mounting portion to the device portion, each of the plurality of connecting members being connected with the mounting portion via a first sliding connection with the upper portion and a second sliding connection with the lower portion, each of the plurality of connecting members rotatable relative to the mounting portion about the first sliding connection and the second sliding connection from a first position to a second position, the device portion being in the retracted position when each of the plurality of connecting members is rotated to the first position, and the device portion being in the extended position when each of the plurality of connecting members is rotated to the second position, each of the plurality of connecting members having an intermediate portion, the intermediate portion of each of the plurality of connecting members being selectively nested within the aperture when each of the plurality of connecting members is in the first position, at least a substantial part of the intermediate portion of each of the plurality of connecting members not being nested within the aperture when each of the plurality of connecting members is in the second position,
wherein a movement of the plurality of connecting members via the first sliding connection and the second sliding connection results in an altering of a distance between a face of the mounting portion and a face of the device portion, and wherein a rotational orientation between the mounting portion and the device portion is adjustable when the device portion is in the extended position.

16. A wall mounting system, comprising:
a first member including a mount surface configured to operatively connect to a surface, the first member including an upper portion and a lower portion, the upper portion and the lower portion being oriented substantially parallel to the lower portion, the upper portion and the lower portion cooperating to define an aperture in the first member;
a second member configured to operatively connect to a device, the second member selectively translatable between an extended position and a retracted position; and
a plurality of connecting members operatively connecting the first member to the second member, each of the plurality of connecting members being connected with the first member via a first sliding connection with the upper portion and a second sliding connection with the lower portion, the first sliding connection and the second sliding connection being oriented substantially parallel to each other, each of the plurality of connecting members rotatable relative to the first member about the first sliding connection and the second sliding connection, each of the plurality of connecting members having an intermediate portion, the intermediate portion of each of the plurality of connecting members being selectively nested within the aperture when the second member is at the retracted position, at least a substantial part of the intermediate portion of each of the plurality of connecting members not being nested within the aperture when the second member is at the extended position, each of the plurality of connecting members being rotatably coupled to the second member at an end opposite to the first sliding connection and the second sliding connection,
wherein a movement of the plurality of connecting members via the first sliding connection and the second sliding connection results in an altering of a distance between a face of the first member and a face of the second member, and wherein a rotational orientation between the first member and the second member is selectively adjustable about an axis that is substantially perpendicular to a direction of change in translational distance between the first member and the second member, the axis being substantially parallel to a vertical plane defined by the direction of change in translational distance between the first member and the second member.

17. A mounting system for mounting a display unit to a wall, comprising:
a base portion configured to operatively attach to the wall and defining a plurality of guide paths formed therein;

an adapter portion configured to operatively attach to the display unit; and a plurality of connecting arms engageable with the base portion via the plurality of guide paths, each of the plurality of connecting arms including:

a base engagement portion engageable with the base portion and movable between a first position and a second position relative to the base portion;

an adapter engagement portion rotatably coupled to the adapter portion and operatively connected to the base engagement portion of the respective connecting arm, and     an intermediate portion extending between the adapter engagement portion and the base engagement portion, wherein the intermediate portion is selectively nested within the base portion when the base engagement portion is at the first position, wherein at least a substantial part of the intermediate portion is not nested within the base portion when the base engagement portion is at the second position; and a rod member rotatably connecting each adapter engagement portion to the adapter portion, wherein a movement of the plurality of connecting arms relative to the base portion via the plurality of guide paths results in a translational movement of the adapter portion relative to the base portion between a retracted position and an extended position.

18. A mounting system for mounting a display unit to a wall, comprising:

a base portion configured to operatively attach to the wall and defining a plurality of guide paths formed therein;

an adapter portion configured to operatively attach to the display unit; and a plurality of connecting arms engageable with the base portion via the plurality of guide paths, each of the plurality of connecting arms including:

a base engagement portion engageable with the base portion and movable between a first position and a second position relative to the base portion,     an adapter engagement portion rotatably coupled to the adapter portion and operatively connected to the base engagement portion of the respective connecting arm, and     an intermediate portion extending between the adapter engagement portion and the base engagement portion, wherein the intermediate portion is selectively nested within the base portion when the base engagement portion is at the first position, wherein at least a substantial part of the intermediate portion is not nested within the base portion when the base engagement portion is at the second position;

wherein a movement of the plurality of connecting arms relative to the base portion via the plurality of guide paths results in a translational movement of the adapter portion relative to the base portion between a retracted position and an extended position, and wherein a locking member is selectively engageable with the base engagement portion of a first connecting arm of the plurality of connecting arms and the base engagement portion of a second connecting arm of the plurality of connecting arms when the adapter portion is in the extended position, thereby substantially locking the adapter portion in the extended position.

* * * * *